United States Patent [19]

Ross

[11] Patent Number: 5,040,934
[45] Date of Patent: Aug. 20, 1991

[54] CARGO RETAINING DEVICE

[76] Inventor: Kenneth J. Ross, 641 Maplewood La., Wixom, Mich. 48096

[21] Appl. No.: 503,258

[22] Filed: Apr. 2, 1990

[51] Int. Cl.⁵ .................................................. B60P 7/02
[52] U.S. Cl. ...................................... 410/97; 410/118; 296/100
[58] Field of Search .................. 410/97, 118; 296/100, 296/43

[56] References Cited

U.S. PATENT DOCUMENTS

| 181,047 | 8/1976 | Cremer | 296/100 |
|---|---|---|---|
| 951,089 | 3/1910 | Cooper | 296/100 |
| 1,966,893 | 7/1934 | Harris | 410/118 |
| 2,465,621 | 3/1949 | Wheeler | 296/100 |
| 2,854,931 | 10/1958 | Campbell | 410/118 |
| 3,165,352 | 1/1965 | Hallock et al. | 296/100 |
| 3,421,726 | 1/1969 | Getter | 296/43 |
| 4,607,876 | 8/1986 | Reed | 296/100 |
| 4,900,204 | 2/1990 | Summers | 410/97 |

FOREIGN PATENT DOCUMENTS 2196907  5/1988  United Kingdom ................ 410/118

Primary Examiner—Robert R. Song
Attorney, Agent, or Firm—Gifford, Groh, Sprinkle, Patmore and Anderson

[57] ABSTRACT

A cargo retaining device as disclosed for use in conjunction with the cargo bed of a vehicle such as the cargo bed of a pickup truck. The cargo retaining device includes a net formed by crisscrossing strands of non-elastic material and having a shape substantially the same as the shape of the cargo bed. An elongated cord extends around the outer perimeter of the net and the cord has a cross-sectional area substantially greater than the cross-sectional area of the strands. The cord is attached to the vehicle so that the net overlies and covers the cargo bed of the vehicle as well as any cargo contained therein.

4 Claims, 1 Drawing Sheet

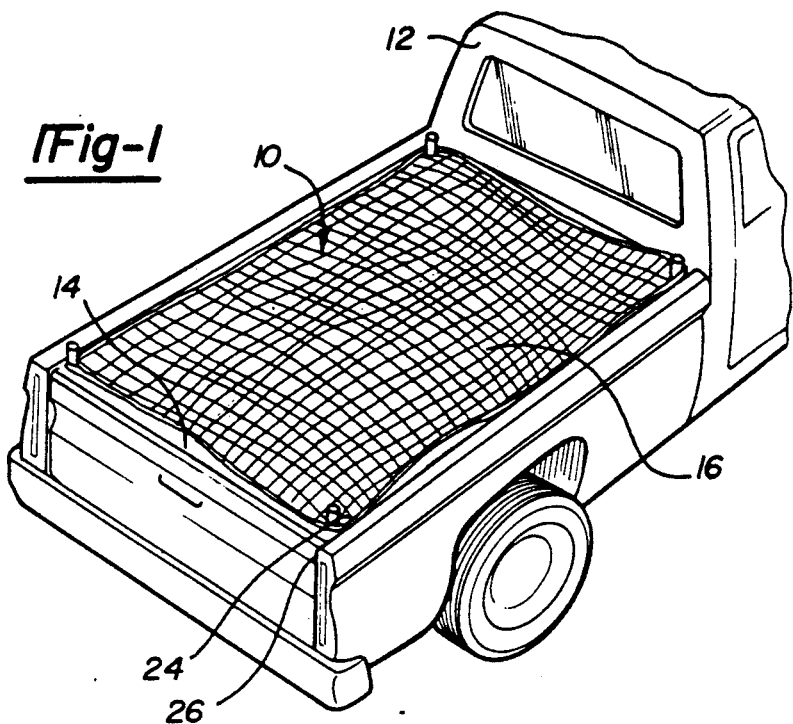
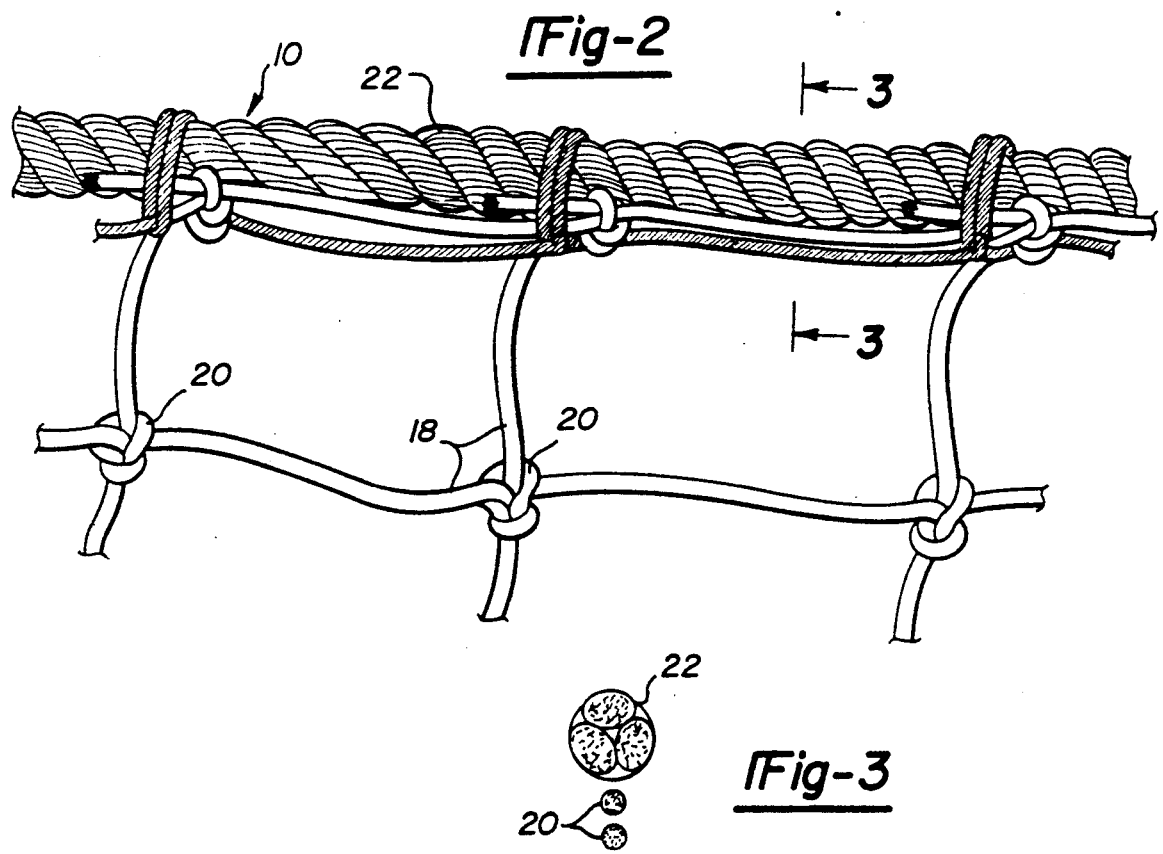

CARGO RETAINING DEVICE

BACKGROUND OF THE INVENTION

I. Field of the Invention

The present invention relates to a cargo retaining device for a vehicle such as a pickup truck.

II. Description of the Prior Art

Many vehicles, such as pickup trucks, boats, trailers and the like include a cargo bed designed to receive and hold cargo of various types. For certain types of cargo, especially light cargo, it is necessary to hold the cargo in the cargo bed while the vehicle is traveling. Otherwise, the cargo may undesirably be blown over the cargo bed as the vehicle travels.

There have been a number of previous known means for retaining the cargo in the cargo bed. In one such means, the cargo is merely tied down by ropes, straps, or the like. This particular method, however, is disadvantageous because it is time consuming and often not safe or wholly effective.

A still further type of cargo retaining device comprises a net which is formed of elastic material. This net is then attached to the vehicle so that the net overlies and extends across the cargo bed of the vehicle. A primary disadvantage of this type of previously known cargo retaining device is that the net is easily damaged not only by the cargo, but also by the environment. Furthermore, since the net is directly attached to the vehicle by hooks or the like, a great deal of stress is imparted to the net at its attachment to the vehicle. This in turn damages the net and results in premature failure of the cargo retaining device.

SUMMARY OF THE PRESENT INVENTION

The present invention provides a cargo retaining device which overcomes the above-mentioned disadvantages of the previously known devices.

In brief, the cargo retention device of the present invention comprises a net formed by crisscrossing strands of material. The strands are made of a non-elastic material and are knotted at each crisscrossing intersection of the strand.

An elongated cord extends around the perimeter of the net and is secured to the net by knots. The cord has a crossectional area substantially greater than the crossectional area of the strands.

The cord is then attached to the vehicle so that the net overlies and covers the cargo bed of the vehicle. Any conventional means, such as hooks, can be used to secure the net to the vehicle.

BRIEF DESCRIPTION OF THE DRAWING

A better understanding of the present invention will be had upon reference to the following detailed description, whether at in conjunction with the accompanying drawing, wherein like reference characters referred to like parts throughout the several views, and in which:

FIG. 1 is a perspective view illustrating a preferred embodiment of the cargo retaining device of the present invention;

FIG. 2 is an enlarged diameter view of a portion of the preferred embodiment of the invention; and FIG. 3 is a cross-sectional view taken along line 3—3 in FIG. 1 and enlarged for clarity.

DETAIL DESCRIPTION OF THE PREFERRED EMBODIMENT OF THE PRESENT INVENTION

With reference first to FIG. 1, a preferred embodiment of the cargo retaining device 10 of the present invention is thereshown for use with a vehicle 12, such as a pickup truck. The vehicle 12 includes a cargo bed 14 designed to contain cargo. Furthermore, as shown in FIG. 1, the cargo bed 14 is substantially rectangular in shape.

The cargo retaining device 10 comprises a net 16 constructed of crisscrossing strands 18 of material. The strands 18 are knotted, as shown at 20 (FIG. 2), at each crisscrossing intersection. The net 16, furthermore, has a shape which substantially corresponds to the shape of the cargo bed 14 of the vehicle 12. Consequently, as shown in FIG. 1, the net 16 is generally rectangular in shape.

The net 16 is constructed of a non-elastic material which is both weather resistent and resistent to physical damage. Preferably, the net 18 is constructed of nylon although other materials can be used.

Referring now to FIGS. 1 and 2, a cord 22 extends around the outer perimeter of the net 16. Preferably the outer cord 22 is constructed of nylon rope but other forms of nylon substitutes can also work that are non-elastic. Additionally, as best shown in FIG. 3, the cord 22 has a cross-sectional area substantially greater than the strands 18. Preferably, the cross-sectional area of the cord 22 is at least ten times greater than the cross-sectional area of the strands 18.

Referring again to FIG. 1, the cargo restraining device 10 is secured to the vehicle 12 so that the net 16 overlies and covers the cargo bed 14. Although any conventional means can be used to secure the net 16 to the vehicle 12 as shown in FIG. 1, hooks 24 are mounted in the stake openings 26 commonly found around the cargo bed. The hooks 24 are then secured to the cord 22 thereby attaching the device 10 to the vehicle 12 in the desired fashion.

From the foregoing, it can be seen that the cargo retaining device of the present invention provides a simple and yet effect means for retaining cargo within the cargo bed 14 of a vehicle 12. Since the net is constructed of a non-elastic and weather resistant material, the net 16 can be used for extended periods of time without replacement or repair. Furthermore, since the cord 22 having a greater cross-sectional area than the strands 18 are secured to the vehicle rather than the strands directly, the stress imparted to the cord 22 is evenly distributed to the net 16.

Although the present invention has been disclosed for use with a pickup truck, it can also be used for boats, trailers and the like without deviation from the spirit of the invention.

Having described my invention, however, many modifications thereto will become apparent to those skilled in the art to which it pertains without deviation from the spirit of the invention as defined by the scope of the amended claims.

I claim:

1. For use with an open cargo bed of a pick up truck, a cargo retaining device comprising:
   a net formed by crisscrossing strands of material, said strands being constructed of an inelastic material, said net having a shape substantially corresponding in shape to the cargo bed, an elongated cord extending around the perimeter of said net, said cord having a cross-sectional area substantially greater than the cross-sectional area of said strands, said cord being constructed of an inelastic material.

means for attaching said cord to the vehicle so that said net overlies and covers the cargo bed, whereby the inelasticity of said strands and the inelasticity of said cord prevents shifting of cargo outside of the cargo bed which may otherwise result from wind loads during operation of the pick up truck.

2. The invention as defined in claim 1 wherein said strands are knotted at each crisscrossing intersection.

3. The invention as defined in claim 1 wherein the cross-sectional area of said cord is at least ten times greater than the cross-sectional area of said strands.

4. The invention as defined in claim 1 wherein said cord and said strands are constructed of nylon.

* * * * *